358-86. OR 2,628,275 SR
SEARCH ROOM

Feb. 10, 1953 L. W. PARKER 2,628,275

RADIO AND TELEVISION DISTRIBUTION SYSTEM
FOR HOTELS AND APARTMENT HOUSES

Filed Feb. 25, 1948 3 Sheets-Sheet 1

T5003

Rh

INVENTOR.
Louis W. Parker
BY
Julius E. Foster
ATTORNEY

Feb. 10, 1953 L. W. PARKER 2,628,275

RADIO AND TELEVISION DISTRIBUTION SYSTEM
FOR HOTELS AND APARTMENT HOUSES

Filed Feb. 25, 1948 3 Sheets-Sheet 2

INVENTOR.
Louis W. Parker
BY Julius E. Foster
ATTORNEY

INVENTOR.
Louis W. Parker
BY
Julius E. Foster
ATTORNEY

Patented Feb. 10, 1953 2,628,275

UNITED STATES PATENT OFFICE 2,628,275

RADIO AND TELEVISION DISTRIBUTION SYSTEM FOR HOTELS AND APARTMENT HOUSES

Louis W. Parker, Little Neck, N. Y.

Application February 25, 1948, Serial No. 10,636

5 Claims. (Cl. 178—5.8)

This invention relates to radio and television distribution systems, particularly useful for hotels and apartment houses, where the signals for the individual receivers may be emitted and controlled from a central point.

Present radio and television distribution systems for hotels and apartment houses suffer from the disadvantages of requiring that a cable be run to each receiver from one central point. These cables, being of the co-axial type, are expensive, and particularly so where the distribution system requires long connecting cables. Moreover, the installation of such systems in hotels and apartment houses that are already built, usually requires the drilling of many holes through the walls and often the breaking up of the wall covering for long lengths where it is desired to conceal the cable in the wall. Such operations are costly and inconvenient to the occupants of the building.

A principal object of the invention, therefore, is to provide a simple and economical radio and television distribution system which is relatively easy and inexpensive to install, without drilling holes in walls or breaking sections out of the walls of finished buildings. The economy both of the system and of its installation are important features of the invention.

In systems for the higher frequency ranges, such as used for FM and television, it is important to control the distribution and operating equipment including the receivers in one building, to prevent undesired radiation that would interfere with the radio services in installations in other buildings. Proper service within the building itself requires a minimum of interference between receivers, such as might be caused by reflections between them, for example, or radiation from oscillators.

Another object of my invention is to provide a distribution system that will operate without causing radiation that would interfere with the radio services in adjacent buildings, or that would cause interference between receivers within the same building.

In present television distribution systems for a plurality of receivers, the signal level or strength of signal to each receiver varies with the load on the system, that is, the number of receivers being supplied from the distribution system.

An object of this invention is to provide a distribution system that will supply a signal of constant strength to each receiver regardless of the number of receivers used at any one time.

In the operation of this invention, I take advantage of the fact that a conductor carrying alternating current, and particularly high frequency current, establishes two kinds of fields, namely, an induction field and a radiation field. In ordinary conventional practice, the radiation field is desired. The main function of the usual antenna is to produce that radiation field in order to transmit energy to a distance. In this invention the induction field is utilized. These two fields, that is, the induction field and the radiation field, are also referred to as the "near field" and the "far field," respectively, which serves further to characterize or identify them in simple language. Of these two fields, the induction field is usually by far the more intense, but the rate at which this field drops with distance is also much faster than in the case of the radiation field. It is not necessary to describe this phenomenon in accurate and complete detail for an understanding of the invention, beyond stating that the induction field is attached to the current carrying medium, while the radiation field gets detached and is free to travel into infinite space.

Each of these fields has an electromagnetic component and an electrostatic component. The fundamental principles involved herein are generally well known, but to my knowledge they have never been utilized in the manner in which I do so in the present invention.

This invention makes use of the induction field from a transmission line located on the wall of a building. Energy from that field is picked up by a small loop in the vicinity of each receiver and transferred through a short transmission line to the receiver.

This invention is designed primarily to make use of the attached field and to reduce as much as possible the detached field. It is not possible, of course, to create an electric field with alternating current and not have some of it get detached. That can be done only with a direct current. However, the extent of such a detached field, or its ratio to the attached portion is controllable, within wide limits. Without going into greater detail, it can be stated, that this control is obtainable by proportioning the physical dimensions of the current carrying conductor, together with one or more other conductors carrying a similar current on the one hand and the length of the radio wave on the other hand.

This invention also provides directional control, so that any radiation field that gets detached will not be radiated in all directions, but vertically only up or down. This is an important advantage, since a radiation field moving parallel to the surface of the ground is most likely to encounter other radio equipment in which it may cause interference. That directional control may be utilized, of course, to direct the radiation in any other selected direction where conditions may make it desirable to do so.

Considered briefly, the system operates thus: a master antenna for a building to be served energizes a master television receiver which is tuned to select a desired television channel; the television signals as thus selected are supplied to a two-wire open transmission line that is terminated in its characteristic impedance and that serves as a local or relay antenna for the receivers within the building; and a loop antenna for each receiver is energized from the transmission line antenna by the field set up by that transmission line antenna, and thus serves to receive the operating signal for its receiver. In various ways the undesired part of the radiation field is limited or nullified to prevent undesired interference effects in systems of adjacent buildings. Thus the antenna effects of the transmission line antenna are substantially restricted to its own building, and, in the main, to the induction field. The signals are supplied to the line in various ways, which are important features of the invention. The invention also embodies important features for controlling the antenna effects of the line, all of which may be more conveniently referred to later in the specification.

In furtherance of the simple and economical installation and operation of this invention, I also utilize as an important element thereof the invention set forth in my Patent No. 2,448,908, issued September 7, 1948, relating to a Television Receiver. There, the receiver picture signal carrier frequency which is amplitude modulated, and the sound signal carrier frequency, which is frequency modulated, are conducted through a common amplifying channel from which the picture signal and the sound signal are then separately detected and applied to picture and sound reproducing devices.

If the receiver is of the superheterodyne type, the picture and the sound carrier frequencies are conducted through a common I. F. channel. The second detector, energized from the I. F. channel, amplitude-detects the picture signal. The two I. F. carrier frequencies are also taken from the common I. F. channel and are heterodyned with each other in the same detector or in another to develop a beat frequency carrier, which will contain the sound signal. That beat frequency carrier is then frequency detected by a frequency discriminator to obtain the sound signal. The picture signal and the sound signal are thus separated out of the common I. F. channel and made available for reproduction in suitable picture and sound reproducers.

In this application I utilize the advantages of that system of the said patent whereby both the picture and the sound carrier frequencies may be conducted on the same common channel. A simpler distribution system may thus be employed between a master receiver and the local receiver station units, since the carrier frequencies for both the picture signal and the sound signal may be transmitted on the same relay transmission line antenna between the main receiver and the local receiver units.

To explain the operating details of the invention, reference is made to the accompanying drawings in which Figure 1 is the cross-section of a pair of conductors carrying radio frequency current, showing the configuration of the resulting field;

Figure 1:
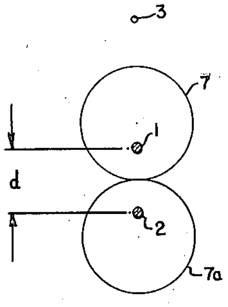
Figure 2:
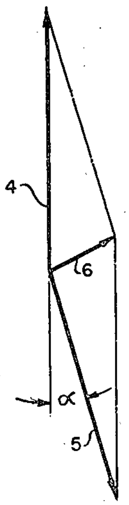
Figure 2 is the vector diagram of these fields at a spaced point.

Referring now to Fig. 1, conductors 1 and 2 are assumed to run perpendicularly to the plane of the drawing and carry radio frequency current in opposite directions. It is also assumed that these currents are of the same magnitude, frequency and opposite wave-phase. Obviously, if the distance $d$ between them were zero (or very small) the fields created would cancel, due to the opposing direction of the currents. However, if $d$ is an appreciable but small distance, a detecting device located at point 3 will indicate the presence of a field. At this point 3, the field will arrive a little sooner from conductor 1 than from 2 since conductor 1 is closer to point 3, and the phase of the wave from 1 will be ahead of that from 2. Since the field strength is reduced with increasing distance from its source, the field of conductor 1 is greater in amplitude than the field from conductor 2. The vector diagram of these two alternating fields acting on point 3 is shown in Fig. 2, where vector 4 represents the maximum value of the field from conductor 1, and vector 5 represents the field from conductor 2. The phase difference is the function of the ratio $d/\lambda$ where $d$ is the distance between the conductors and $\lambda$ the wave length. If expressed in degrees $\alpha$ is $360d/\lambda$.

The amount of phase difference is added or subtracted to the 180 degree phase difference existing between the fields as set up by the currents in the two conductors. Vectors 4 and 5 have lengths proportional to the fields from each conductor at point 3. The resultant voltage is the diagonal 6. This voltage is the sum of the voltages induced by both the induction and the radiation fields. The induction field very near the conductors is very intense and drops as the cube of the distance and a little further as the square of the distance, while the radiation field drops steadily as the first power of the distance. At $\frac{1}{2\pi}$ wave lengths the induction field drops to a value equal to the radiation field after which the induction field rapidly disappears, leaving only the radiation field.

Since the aim of this invention is to transmit for only a short distance, and to create a reduced field at a greater distance, it may be concluded that the most suitable wave length used ought to be not less than $2\pi$ times the greatest required transmission distance.

Returning now to Figures 1 and 2, it is seen that the resultant vector 6 is a function of both the angle $\alpha$ and the lengths of the vectors 4 and 5. If it be assumed that point 3 is placed further away from conductors 1 and 2, the angle remains unchanged, while vectors 4 and 5 become more nearly equal. In line with the aim of this invention, therefore, the more suitable way to obtain resultant vector 6 is to use as small an angle as possible and as great a difference between vectors 4 and 5 as possible. In that way at a point more distant from conductors 1 and 2, the signal will be weakest, since the two vectors will be practically equal and nearly 180 degrees out of phase.

Angle $\alpha$ is determined by the ratio $$\frac{d}{\lambda}$$

and $\lambda$ is $2\pi$ times the greatest transmission distance D that is desired from conductors 1 and 2, that constitute the local relay transmission line antenna, to the local receiver pick-up element or loop. Therefore, the sole determinant for $\alpha$ is $d$. If we assume that $\alpha$ should be less than 3 degrees, which is $\frac{1}{120}$ of a wavelength, to avoid excessive radiation, $d$ becomes the function of the greatest transmission distance D. In other words, $$\alpha=\frac{d}{\lambda}=\frac{d}{2\pi D}=\frac{1}{120}, \text{ making } d=\frac{2\pi D}{120}$$

In a numerical example if D is taken as 180 cm. (about 6 ft.) then $$d=\frac{2\pi\times 180}{120}=9.4 \text{ cm.}$$

or about $3\frac{3}{4}$ inches spacing between conductors 1 and 2 of the transmission line antenna. The invention, however, is not limited to this $3\frac{3}{4}$ inch spacing. Other spacing may be used if either the wavelength or $\alpha$ is different from the above example value.

In the above example, the shortest wave length $\lambda=120d=120\times 9.4=1130$ cm. or 11.3 meters, corresponding to about 26.5 mc.

Figure 3:
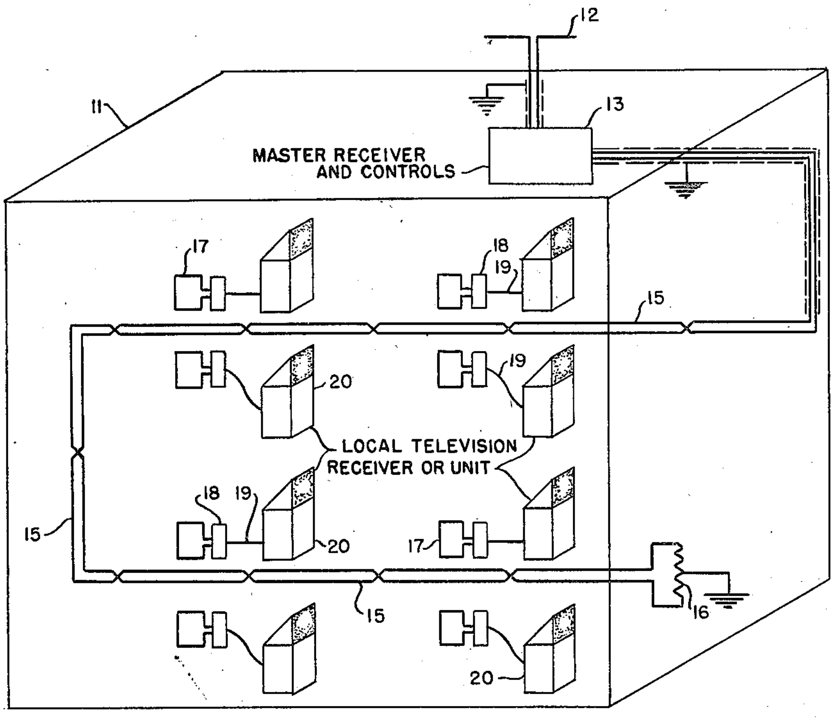
Figure 3 illustrates schematically a practical application of the invention in a building.

The example transmission distance of six feet is more than sufficient if the transmission line and the receiving loops are located as shown in Fig. 3.

The drop in the useful signal amplitude due to partial cancellation is not excessive and can be readily calculated for the above numerical example. Vector 4 corresponds to a signal strength 72 inches away from conductor 1 and vector 5 to a signal strength about 76 inches away from conductor 2. Since the signal strength drops roughly as the square of the distance, the square of $\frac{76}{72}$ or $(1.055)^2$ equals 1.115 which is the ratio of the signal strengths represented by the two vectors. Angle $\alpha$ was assumed to be 3 degrees. Therefore, the resultant vector 6 will be, according to the cosine law, $$R=\sqrt{1+1.115^2-2\times 1.115 \cos 3^\circ}=\sqrt{2.243-2.23\times 0.9986}=\sqrt{0.017}=0.130$$

In other words, the signal dropped to about 13% of the value it would have had if a single wire were used for the transmission line antenna. At a greater distance, where the two vectors may be considered equal, the signal R would be $R=\sqrt{2-2\cos 3^\circ}=\sqrt{0.0028}=0.053$ or about 5% of the value it would have with a single wire. This drop in field strength is computed as due to cancellation. However, there is an additional drop in field strength at a distance of one wavelength or more, due to the practical disappearance of the induction field.

Another thing to take into consideration is that this field at a point 3 at a distance from the antenna is appreciable only vertically above or below the antenna. This is shown in Fig. 1 where curve 7 represents the field strength. At any point in space further away from the vertical plane through the conductors 1 and 2, the resultant field strength decreases, for illustrative purposes, substantially in accordance with the difference between the field strength value represented at the points of intersection between the direction lines, from the selected point in space to the conductors 1 and 2, and the field strength patterns 7 and 7a for the two conductors 1 and 2.

A diagrammatic illustration of one practical application of this invention is shown in Fig. 3. In that figure, a building is represented as cube 11. In this specific example, the building has four floors, where reception of television and other R. F. signals is desired.

The signal is originally picked up from a broadcasting station by a master antenna 12 and supplied to a master receiver and related control equipment 13 in which the signal undergoes a processing operation and is then supplied at the proper level and frequency to a transmission line which is to serve as a local or relay antenna. This processing operation may consist simply of the selection of a band of carrier frequencies and amplification of them. However, in the case of FM and television signals, it is preferable to change the frequency of the incoming signal as well as to amplify it. This is especially so when an installation is to be made in its entirety, including the main receiver, the local antenna, and the local receivers. A much greater amplification is practical when the carrier frequency is changed. A less expensive local receiver may then be used, and the local receiver may be made for a lower frequency.

The two-wire transmission line 15 consisting of conductors 1 and 2 of Fig. 1 is balanced to ground and may be disposed in one way, as shown, on the outside of the building between adjacent floors, as between first and second floors, and between third and fourth floors.

It is terminated in its characteristic impedance 16. The transmission line 15 may, of course, alternatively, be disposed, as desired, within the building. Energy from the transmission line 15 acting as a transmitting antenna, is picked up on a small loop 17, located at each local receiver 20 and disposed not more than six feet away from antenna line 15. The signal picked up by loop 17 may be fed through an impedance transformer, such as a cathode follower in box 18 and a short connecting transmission line 19 to the local television receiver 20. As shown in Fig. 3, any number of local receiver units 20 may be supplied from the transmission line antenna 15 through the loops 17 without affecting the signal strength from the line 15 at any other loop 17. Where the selected incoming carrier frequency at the main receiver 13 is not changed when supplied to the local transmission line antenna 15, the local receiver 20 may be standard and complete conventional receivers. The transmission line antenna 15 then serves as a local relay antenna to step up the signal strength and to re-radiate or transmit the selected television signal or signals supplied to the local relay line antenna by one or more master receivers and control equipments 13.

Not much trouble can be caused by receiver radiation, since the cathode follower or R. F. amplifier connected between the pickup loop and the receiver will reduce any outgoing signal. Also the size of the loop is too small for efficient radiation and the signal level so high that a comparatively weak radiation from another receiver is of no significance.

The frequency changing equipment (if such is used) is located in box 13 and in order to reduce any possible feedback the leads going into and out of this box are shielded. The equipment itself may be conventional, including, for example, a converter such as used in a superheterodyne receiver. Or the signal may be de-modulated and put on a transmitter of a carrier of another frequency and supplied to the local antenna. If the frequency is not changed to a much lower value, it may be preferable to change it to that of a television channel that is unused in that region. In case of a television receiver, the set is usually capable of tuning in any of thirteen channels, although only a few of these channels are used in any one geographical location. If the signal carrier frequency is changed to that of an unused channel, standard receivers will work with this system by simply changing the selector switch position. If the carrier frequency or frequencies as received at the master receiver are converted to lower frequencies not corresponding to any of the unused television band carrier frequencies, a standard receiver may be used if a frequency converter is installed between the pick-up loop and the receiver.

Where the frequency of the original radiated carrier is changed to the frequency of one of the unused television channels, instead of to a lower frequency, the wave length may not be sufficient to provide an induction field of sufficient distance D if the preferred wire spacing of the relay antenna is to be maintained. However, since the radiated field is concentrated in the direction of the pickup loops, it is not difficult even without the induction field, to pick up enough signal for operation of a receiver, while, at the same time, not establishing a great enough radiated field at a distance to cause interference with other services. To prevent or limit such possible interference, the two wires of the relay antenna are transposed at short intervals. That helps to reduce the signal at a distance but it may be necessary in that case, to experiment somewhat with the location of the pickup loops, since some dead spots will occur.

Practically any radio service, such as broadcast, FM, facsimile or television may be distributed by this invention, but the more bands of different services are used, the more complicated will the control equipment 13 be. When used for television only, two or three signals may be rebroadcast at a much greater than usual field strength. This makes the use of insensitive and poorly selective receivers practical. They may be of the simple T. R. F. type. Electrical noises originating in the building would be swamped by the greater signal level. It is expected that in spite of this great signal level, the R. F. power used for distribution would be in order of only one watt.

Figure 6:
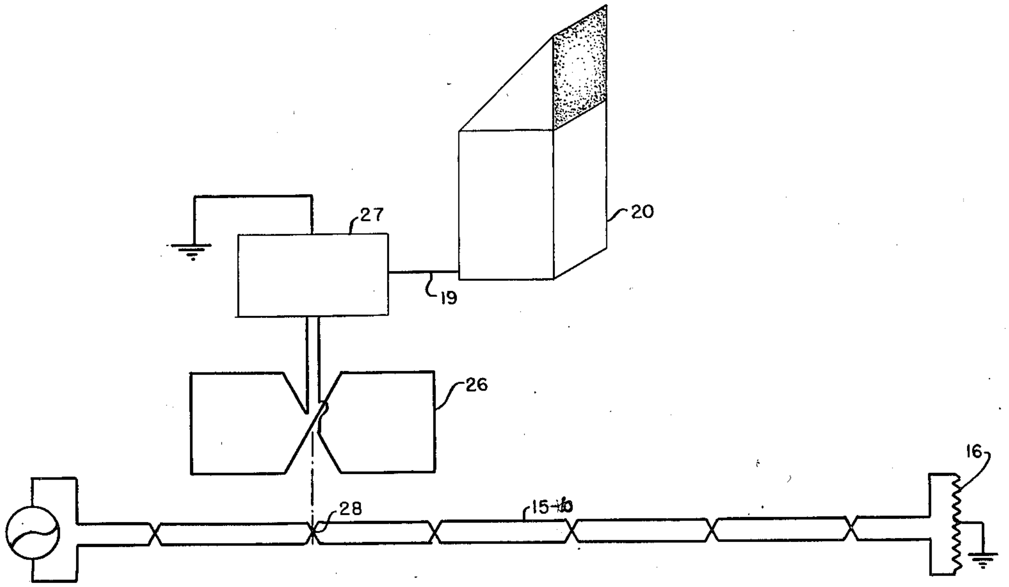
Figure 6 is a diagram showing a modified form of loop for use between the transmission line and a receiver.
Figure 5:
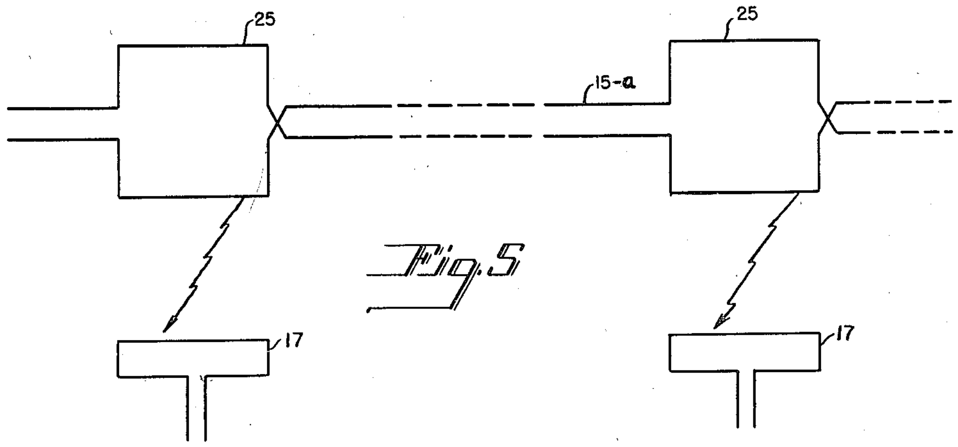
Figure 5 is a schematic view of two transmission line sections opened to large areas adjacent the regions of the receiver pick-up loops.

In Figs. 5 and 6 are shown two arrangements of the transmission line antenna for reducing radiation that would be established by an open two-wire line.

In Fig. 5, the conductors 1 and 2 of the relay transmission line antenna 15–*a* are placed very close together, even twisted except where pick-up loop antennas 17 are disposed. There the conductors of the relay line antenna are separated to form open loop sections 25 of desired areas. Radiation from those loop sections is minimized by transposing the conductors between the loop sections 25 so the loops are alternately of opposite phase.

In Fig. 6 an additional safeguard is shown to further reduce radiation. Also, the pick up system connected to the receiver is so designed as to reject signals originating from sources other than the transmission line. The transmission line 15–*b* is transposed at frequent intervals, such as, for example, at every foot. This helps to maintain balance to ground. Also at a point horizontally spaced from the line, the detached part of the wave will be opposed by similar radiation in opposite phase. Near the line, however, where the distance to one portion of the line may be considerably less than to another opposing portion, there will be only partial cancellation, and a signal will be obtained.

One way to consider such transmission line is that it consists of a large number of small loops, half of which are transmitting in the opposite phase to the others. Since the transmitted field is proportional to the area of the transmitting loop, each of these small loops will radiate only a small amount of energy. The cancellation of these small fields will be complete in some places. At some other places only partial cancellation will be effected even at a distance. This is due to the phase difference of signals arriving from slightly different distances. However, the signal will be very much reduced at a distance even with partial cancellation. It must be emphasized that this cancellation effect is in addition to the other effects described in the foregoing, which tend to increase the rate of attenuation of the signal with distance.

In Fig. 6 the receiving loop 26 has a construction somewhat similar to that of the transmission line 15. The loop 26 is composed of two loop sections which feed the signal in opposing phases to a coupling unit 27. The pick-up from a distant transmitter will be very low on this double loop. A greater number of loop sections, such as four would have even less pick-up. Since the double loop 26 is near the transmission line, however, and is arranged so the transposition center line of the loop is aligned with the adjacent transposition 28 of the transmission line antenna 15, the magnetic field will reach the opposing parts of loop 26 in opposite phases. In this way the induced voltages will add in the two loops sections. Care must be taken however, that loop 26 be exactly symmetrical and balanced to ground. This is done in the same way as with receiving loops of direction finders. One such well-known method uses a balanced transformer with electrostatic shield between primary and secondary windings. In this way the transmission line leading from the transformer to the receiver is not balanced. Such system may be used in Fig. 6, where the transformer is shown as box 27.

Thus, one broad feature of the invention herein contemplates the utilization of a properly terminated transmission line as a local relay antenna. Another feature is the manner in which that local antenna is disposed and arranged in order to provide a desired signal for local receivers while reducing undesirable radiation to other receivers.

Another important feature of this invention is the conversion of the television signal, as received from a selected channel that is available and transmitted in that geographical region, to a channel that is not assigned and used in that region, and the re-radiation of the received signal on that unassigned channel. Such re-radiation of the television signal of the received channel by transmission from the local relay antenna on an unused channel provides a simple method for distribution within a limited zone, such as a building, with a minimum of installation expense or installation delay. Standard receivers can be utilized immediately without modification of their construction. Only an auxiliary or secondary identification of the channels on the tuning switch need be made. By means of the radiating antenna as disclosed herein, radiation horizontally to a distance of 100 feet could be made practically negligible.

Where the signals from several television channels are to be distributed, a separate master receiver is employed to bring in each selected television channel, and suitable signal carrier frequencies are supplied to the local relay transmission line antenna, according to whether the received signal carrier frequencies or converted frequencies are employed for re-radiation of the received signals.

The arrangement shown in Fig. 3 is generalized. The relay transmission line antenna 15 could be supported on the outside wall of a building between adjacent floors of superposed pairs, as previously indicated. In that case the local receiver loop antenna 17 could be placed adjacent the tops and bottoms of the window frames or near the floor boards or molding trim to be within the distance D, which, for illustrative purposes above, was taken to be six feet. Obviously, the relay transmission line antenna 15 could be disposed more conveniently on and along inside walls of hallways in the building to be serviced. In that case the local receiver loop antennas 17 could easily be disposed on or near the inner surface of the wall of the room on the hallway, and within the transmission distance D established or desired for the system.

For inside disposition of the relay antenna wires 15, they could be applied to the walls in the form of exposed narrow metallic foil or strips, and covered in suitable colors to provide a decorative border or other motif for the walls. It might be necessary to vary the patterns where metal lath is used in the walls, in order to be able to transmit the induction or radiation field around and past the lath edges, from the transmission line antenna 15.

In a hotel, where an installation would include the local receivers as well, certain economies are possible. Receiver units, or half-receivers may be employed at the local stations. By way of illustration, the present invention may be applied to a system as shown in Fig. 4.

A master receiver 40 energized from an antenna 41 serves to tune-in a selected channel, and to act as a monitoring equipment. It serves also to provide the I. F. picture and sound carrier frequencies for delivery to a local two-wire relay transmission line antenna 42. That relay antenna 42 then transmits energy by an induction field or by a radiation field, or both, to local receiver loop antennas 43 to energize associated local half-receiver units 44.

Figure 4:
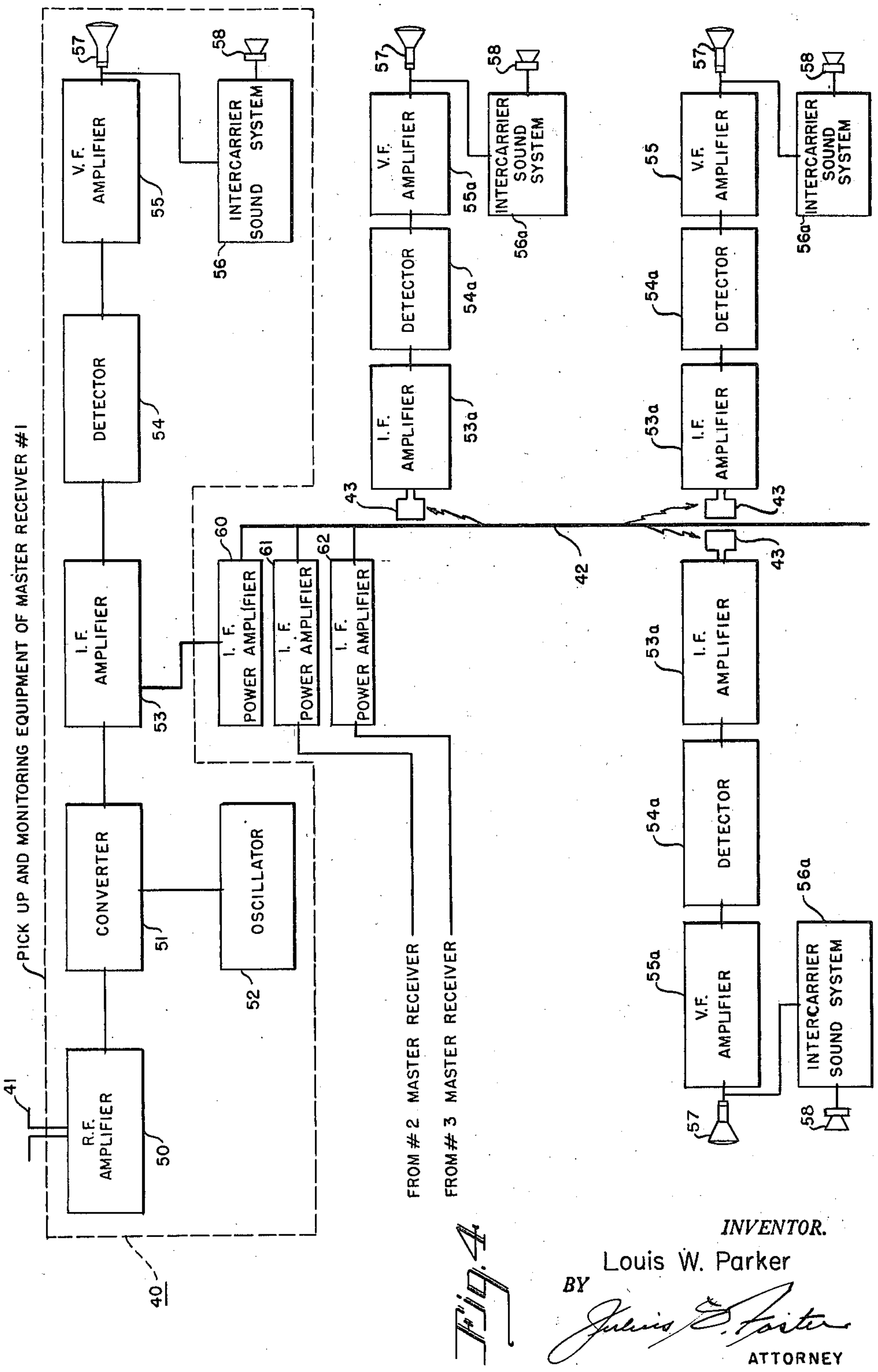
Figure 4 is a block diagram of the distribution system.

In this system, as shown in Fig. 4, it is possible to achieve considerable economies by the use of the invention disclosed in my Patent No. 2,448,908 relating to a television receiver.

The operation of that invention may be considered with reference to the elements included in the enclosure designated as master receiver 40 of Fig. 4. As there shown, the receiver 43 is of the superheterodyne type, and comprises an R. F. amplifier 50, a freqency-converter 51, an oscillator 52, an I. F. amplifier 53, a second detector 54, a video frequency amplifier 55, an intercarrier sound detecting system 56, a picture-reproducing tube 57 and a sound-reproducing speaker 58.

In conventional television receivers, one I. F. channel is provided for the picture signal carrier frequency, and a separate I. F. channel is provided for the sound signal carrier frequency, the two carrier frequencies being separated by suitable filters energized from the frequency converter.

In the system of my said patent, however, I utilize only one I. F. channel in common for both the picture and the sound signal carriers. An important use is then made of the frequency spacing or difference between the picture signal carrier frequency and the sound signal carrier frequency to obtain a beat frequency carrier frequency which is equal to the frequency difference between the picture and the sound carrier frequencies. At the television transmitting station, the frequency spacing between the picture signal carrier frequency and the sound signal carrier frequency is kept practically constant. That beat frequency is therefore practically constant.

Since the picture carrier frequency is amplitude-modulated by the picture signal and the sound carrier frequency is frequency-modulated by the sound signal, the derived beat frequency will carry the sound signal intelligence as a frequency modulation which may be readily detected by a frequency discriminator.

Since the sound signal may be readily separated by that method, it is no longer necessary to separate the picture carrier frequency and the sound carrier frequency into separate individual channels in a T. R. F. receiver, or into separate I. F. channels in a superheterodyne receiver. The picture and the sound signal carrier frequencies, as transmitted, are received by the antenna 41 and the R. F. amplifier 50, and, after being converted to different positions in the frequency spectrum by the local oscillator 52, in the case of a superheterodyne receiver, are transmitted through a single common I. F. amplifying channel 53 to a second detector 54. That detector is suitably energized to establish a transfer characteristic that will cause the picture I. F. carrier frequency and the sound I. F. carrier frequency to heterodyne with each other, and to establish a beat frequency in the output (among other frequency combinations), that will be equal to the difference between the picture I. F. carrier frequency and the frequency-modulated sound I. F. carrier frequency. That frequency difference is, of course, the same as the frequency difference that originally existed between the picture signal carrier frequency and the sound signal carrier frequency at the transmitting station. The frequency-modulation detector or discriminator is tuned to that beat frequency and serves to remove the sound signal therefrom.

Where the three master receivers are of the superheterodyne type, as shown in Fig. 4, by way of example, their I. F. channel frequencies should be different, by appropriate design of the I. F. circuits, so the several I. F. channel frequencies can be supplied to the relay transmission line antenna at the same time. The local half receiver units then need have only operating components corresponding to those in the master receiver 40 following the I. F. amplifier 53, plus an initial I. F. amplifier section to select a desired I. F. frequency from the transmission line relay antenna 42. Each half receiver than has an I. F. amplifier section 53–*a*, a second detector 54–*a*, a video frequency amplifier 55–*a*, an intercarrier sound detecting system 56–*a*, a picture tube 57–*a* and a sound reproducer 58–*a*. The tuner switch for this half receiver may tune the I. F. amplifier to one of the available frequencies on the antenna 42, or a number of I. F. strips may be provided, each tuned for one of the I. F. frequencies bands on relay antenna 42, corresponding to the channels available, so the selector switch need merely select the I. F. strip carrying the frequency band for the desired transmitted television channel.

By thus transmitting both the picture signal and the sound signal carrier frequencies over the same line for re-radiation locally within a building, the cost of expensive co-axial cables is obviated, and a simple distribution system is made available.

By utilization of the intercarrier sound system, of my co-pending application, in this system, greater economies are effected by the simpler receiver units that may be employed.

As shown in Fig. 4, an I. F. power amplifier 60 is connected between the I. F. amplifier 53 of the master receiver 40 (No. 1) and the relay antenna 42. The amplifier 60 is preferably fed from the middle or from an earlier stage of the I. F. amplifier 53 in order to retain the original relationship and ratio of carrier to side bands as much as possible.

Similar I. F. power amplifiers 61 and 62 are similarly fed from two other master receivers tuned to two other channels.

I claim:

1. A radio and television distribution system for multiple dwelling buildings and the like, comprising a transmission line carried by the building, extending along floors at different levels, said line consisting of a pair of spaced conductors transposed at a number of points on each level, so as to cancel out signals at a distance from said line while allowing signals to be picked up from said line at short distances, means for receiving radio and television signals, means for changing the frequency thereof, while maintaining it in megacycles, means for applying said signals of changed frequency to said line, and receivers having pick-up loops located adjacent transposition points in said line, within the area where signal cancellation does not occur.

2. A radio and television distribution system for multiple dwelling buildings and the like, comprising a transmission line on the exterior of the building extending along alternate floors adjacent windows, said line consisting of a pair of spaced conductors transposed at a number of points on each level so as to cancel out signals at a distance, while allowing signals to be transmitted for short distances, means for receiving radio and television signals, means for converting the frequency thereof while maintaining it in the megacycles, means for applying such converted frequency signals to said transmission line, and receivers having pick-up loops located in the pick-up area of one part of said line and out of the pick-up area of other parts of said line, adjacent to transposition points of said line.

3. A radio and television distribution system for multiple dwelling buildings and the like, comprising a transmission line carried by the building, extending along floors adjacent windows, said line consisting of a pair of spaced conductors transposed at a number of points on each level so as to cancel out signals at a distance while providing a pick-up area adjacent untransposed sections of said line, means for receiving radio and television signals, means for converting the frequency thereof to that of a different television channel not in use in the area occupied by the building, and receivers, each having a pick-up loop located in the pick-up area of an individual untransposed section of said line, but adjacent to transposition points thereof.

4. A radio and television distribution system for multiple dwelling buildings and the like, comprising a transmission line on the exterior of the building, extending along alternate floors adjacent windows, said line consisting of a pair of spaced conductors transposed at a number of points on each level so as to cancel out signals at a distance, while providing a pick-up area adjacent untransposed sections of said line, means for receiving a number of different radio and television signals simultaneously, means for changing the frequency of such signals, while maintaining it in the megacycles, means for applying such signals of changed frequency to said transmission line, and a plurality of receivers, each having a pick-up loop located in the pick-up area of an individual untransposed section of said line, but adjacent of transposition points, and means at each receiver for selecting the frequency of signals to be received by pick-up from said line.

5. A radio and television distribution system for multiple dwelling buildings and the like, comprising a transmission line attached to the building, extending along floors adjacent windows, said line consisting of a pair of spaced conductors transposed at a number of points on each level so as to cancel out signals at a distance, while providing a pick-up area adjacent untransposed sections of said line, means for receiving a number of different radio and television signals simultaneously, means for lowering the frequency of the received signals while maintaining the frequency in the order of megacycles, means for applying the signals at such lowered frequency to said transmission line, and a plurality of receivers, each having a pick-up loop located in the pick-up area of an individual untransposed section of said line, but adjacent to transposition points, and means at each receiver for tuning said receiver to the frequency of signals transmitted from said line.

LOUIS W. PARKER.

REFERENCES CITED

The following references are of record in the file of this patent:

UNITED STATES PATENTS

| Number | Name | Date |
|---|---|---|
| 1,989,466 | Satterlee | Jan. 29, 1935 |
| 2,008,279 | Hopkins | July 16, 1935 |
| 2,035,545 | Green | Mar. 31, 1936 |
| 2,118,471 | Monk | May 24, 1938 |
| 2,122,145 | Kear | June 28, 1938 |
| 2,134,416 | Place | Oct. 25, 1938 |
| 2,135,577 | Herbst | Nov. 8, 1938 |
| 2,208,922 | Butler | July 23, 1940 |
| 2,222,606 | Crook | Nov. 26, 1940 |
| 2,229,043 | Butler | Jan. 21, 1941 |
| 2,241,586 | Dorsman | May 13, 1941 |
| 2,252,641 | Poliokoff | Aug. 12, 1941 |
| 2,298,435 | Turuck | Oct. 13, 1942 |
| 2,394,444 | Halstead | Feb. 5, 1946 |
| 2,407,417 | Halstead | Sept. 10, 1946 |
| 2,419,833 | Grimes | Apr. 29, 1947 |
| 2,448,908 | Parker | Sept. 7, 1948 |

OTHER REFERENCES

Television & Short Wave World, July 1937, pages 399, 400.

Television & Short Wave World, April 1937, page 205.